United States Patent
Pylappan et al.

(10) Patent No.: US 11,722,843 B2
(45) Date of Patent: Aug. 8, 2023

(54) SMART LOCATION DETERMINATION FOR ARRIVAL ESTIMATION AND GENERATION OF ARRIVAL ALERTS

(71) Applicant: RAKUTEN GROUP, INC., Tokyo (JP)

(72) Inventors: Seejo Pylappan, Cupertino, CA (US); Denis Laprise, Sunnyvale, CA (US); Jaron Waldman, Palo Alto, CA (US)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/402,408

(22) Filed: May 3, 2019

(65) Prior Publication Data

US 2019/0342718 A1   Nov. 7, 2019

Related U.S. Application Data

(60) Provisional application No. 62/666,451, filed on May 3, 2018, provisional application No. 62/666,416, filed on May 3, 2018.

(51) Int. Cl.
*H04W 4/029* (2018.01)
*H04W 4/02* (2018.01)
(Continued)

(52) U.S. Cl.
CPC ............. *H04W 4/029* (2018.02); *G01S 19/49* (2013.01); *G06Q 10/063114* (2013.01);
(Continued)

(58) Field of Classification Search
None
See application file for complete search history.

(56) References Cited

U.S. PATENT DOCUMENTS 5,657,010 A * 8/1997 Jones ..................... G08G 1/123
340/988
5,724,243 A * 3/1998 Westerlage ............ G08G 1/202
701/465
(Continued)

FOREIGN PATENT DOCUMENTS

EP    1926074 A1    5/2008
EP    2116013 A2    11/2009
(Continued)

OTHER PUBLICATIONS

International Search Report and Written Opinion dated Jul. 12, 2019 for corresponding PCT Application No. PCT/US2019/030561.
(Continued)

*Primary Examiner* — Muhammad Adnan
(74) *Attorney, Agent, or Firm* — Polsinelli PC

(57) ABSTRACT

Systems, methods and computer-readable media are disclosed for adjustment in the amount of calculations performed at a server for determining a location of a device for purposes of providing an arrival alert to a destination of arrival of the device. In one aspect, a method includes determining a zone around a destination; receiving location information from a tracking device that is traveling to the destination; based on the location information and the zone, determining whether the tracking device is within the zone to yield a determination; determining a remaining time for a user associated with the tracking device to reach the destination based on the determination; and providing an arrival alert to the destination regarding an arrival time of the user at the destination based on the remaining time and an arrival threshold.

19 Claims, 6 Drawing Sheets

(51) Int. Cl.
| | | |
|---|---|---|
| *H04W 4/021* | (2018.01) | |
| *H04W 4/38* | (2018.01) | |
| *H04W 88/04* | (2009.01) | |
| *H04L 67/52* | (2022.01) | |
| *H04L 67/53* | (2022.01) | |
| *G06N 20/00* | (2019.01) | |
| *G06Q 10/0631* | (2023.01) | |
| *G01S 19/49* | (2010.01) | |
| *G08B 21/22* | (2006.01) | |
| *H04W 4/23* | (2018.01) | |
| *H04W 4/70* | (2018.01) | |
| *H04W 4/80* | (2018.01) | |
| *H04W 4/12* | (2009.01) | |
| *H04W 64/00* | (2009.01) | |
| *G06Q 30/0601* | (2023.01) | |
| *G08G 1/00* | (2006.01) | |
| *H04L 67/565* | (2022.01) | |
| *G01S 19/13* | (2010.01) | |

(52) U.S. Cl.
CPC ......... *G06Q 30/0633* (2013.01); *G08B 21/22* (2013.01); *G08G 1/205* (2013.01); *H04L 67/52* (2022.05); *H04L 67/53* (2022.05); *H04L 67/565* (2022.05); *H04W 4/021* (2013.01); *H04W 4/023* (2013.01); *H04W 4/025* (2013.01); *H04W 4/12* (2013.01); *H04W 4/23* (2018.02); *H04W 4/38* (2018.02); *H04W 4/70* (2018.02); *H04W 4/80* (2018.02); *H04W 64/003* (2013.01); *H04W 88/04* (2013.01); *G01S 19/13* (2013.01); *G06N 20/00* (2019.01)

(56) References Cited

U.S. PATENT DOCUMENTS

| | | | | |
|---|---|---|---|---|
| 7,394,403 B2 * | 7/2008 | Winkler | G08G 1/127 | |
| | | | 701/465 | |
| 8,437,948 B1 * | 5/2013 | Balasundaram | G08G 1/096838 | |
| | | | 701/119 | |
| 8,760,320 B2 * | 6/2014 | Kosai | G08G 1/163 | |
| | | | 340/988 | |
| 9,037,405 B2 * | 5/2015 | Gourlay | G08G 1/096844 | |
| | | | 701/465 | |
| 9,100,795 B2 * | 8/2015 | Sartipi | H04W 4/029 | |
| 9,177,282 B2 * | 11/2015 | Stevens | G06Q 10/0833 | |
| 9,347,783 B2 * | 5/2016 | Samuel | A01K 15/021 | |
| 9,386,141 B2 * | 7/2016 | Osann, Jr. | H04W 4/025 | |
| 9,557,185 B2 * | 1/2017 | Kimes | G01C 21/343 | |
| 9,754,492 B2 * | 9/2017 | Del Vecchio | H04W 4/023 | |
| 9,928,540 B1 * | 3/2018 | Gerard | G06Q 10/083 | |
| 9,958,280 B2 * | 5/2018 | Scofield | G08G 1/096838 | |
| 10,127,496 B1 * | 11/2018 | Fu | G06N 3/045 | |
| 10,165,404 B2 * | 12/2018 | Lu | H04W 4/029 | |
| 10,267,643 B2 * | 4/2019 | Mitchell | G01C 21/367 | |
| 10,540,705 B2 * | 1/2020 | Agarwal | G06Q 30/0635 | |
| 10,575,138 B1 * | 2/2020 | Klinkner | G08B 21/24 | |
| 10,750,374 B1 * | 8/2020 | Keshavamurthy | G08G 1/0112 | |
| 2006/0167784 A1 * | 7/2006 | Hoffberg | H04W 4/029 | |
| | | | 705/37 | |
| 2006/0206610 A1 * | 9/2006 | Ling | H04W 4/02 | |
| | | | 707/999.107 | |
| 2006/0270421 A1 * | 11/2006 | Phillips | G08B 21/0236 | |
| | | | 455/457 | |
| 2007/0015518 A1 * | 1/2007 | Winter | H04W 68/00 | |
| | | | 455/456.1 | |
| 2007/0124244 A1 * | 5/2007 | Mock | G08G 1/207 | |
| | | | 705/50 | |
| 2008/0046326 A1 * | 2/2008 | Horstemeyer | G08G 1/20 | |
| | | | 705/14.69 | |
| 2008/0100475 A1 * | 5/2008 | Horstemeyer | G06Q 10/0833 | |
| | | | 340/994 | |
| 2009/0319172 A1 | 12/2009 | Almeida et al. | | |
| 2010/0027527 A1 * | 2/2010 | Higgins | H04L 67/52 | |
| | | | 370/351 | |
| 2010/0289644 A1 * | 11/2010 | Slavin | G08B 13/2402 | |
| | | | 340/568.1 | |
| 2010/0323722 A1 * | 12/2010 | Hatami | H04W 4/21 | |
| | | | 701/465 | |
| 2011/0133888 A1 * | 6/2011 | Stevens | G06Q 10/0833 | |
| | | | 340/8.1 | |
| 2011/0153143 A1 * | 6/2011 | O'Neil | A01B 69/007 | |
| | | | 701/31.4 | |
| 2011/0161001 A1 * | 6/2011 | Fink | G01C 21/3605 | |
| | | | 701/533 | |
| 2011/0231091 A1 * | 9/2011 | Gourlay | G08G 1/096883 | |
| | | | 701/465 | |
| 2012/0326922 A1 | 12/2012 | Yang et al. | | |
| 2013/0183924 A1 | 7/2013 | Saigh et al. | | |
| 2014/0232570 A1 | 8/2014 | Skinder et al. | | |
| 2014/0232593 A1 | 8/2014 | Varoglu | | |
| 2014/0278032 A1 * | 9/2014 | Scofield | G01C 21/3492 | |
| | | | 701/118 | |
| 2015/0073703 A1 | 5/2015 | Jouaux et al. | | |
| 2015/0253146 A1 * | 9/2015 | Annapureddy | G01C 21/3641 | |
| | | | 701/490 | |
| 2015/0296371 A1 * | 10/2015 | Kong | H04M 1/72463 | |
| | | | 455/419 | |
| 2016/0012729 A1 | 1/2016 | Del Vecchio et al. | | |
| 2016/0027307 A1 * | 1/2016 | Abhyanker | G08G 1/202 | |
| | | | 701/117 | |
| 2016/0155088 A1 | 6/2016 | Pylappan et al. | | |
| 2016/0247113 A1 * | 8/2016 | Rademaker | G06Q 10/083 | |
| 2016/0321735 A1 * | 11/2016 | Huang | G06Q 10/101 | |
| 2017/0076227 A1 * | 3/2017 | Elgie | G01C 21/3469 | |
| 2017/0347279 A1 * | 11/2017 | Bejerano | H04W 72/30 | |
| 2017/0372616 A1 * | 12/2017 | Del Vecchio | G06Q 10/109 | |
| 2018/0121994 A1 * | 5/2018 | Matsunaga | G06Q 30/0635 | |
| 2018/0174444 A1 * | 6/2018 | Serrano | H04B 17/318 | |
| 2018/0188695 A1 * | 7/2018 | Kumar | G04G 13/02 | |
| 2018/0224291 A1 | 8/2018 | Tuukkanen et al. | | |
| 2018/0338237 A1 * | 11/2018 | Maheswaran | H04W 64/006 | |
| 2019/0322367 A1 * | 10/2019 | El Idrissi | H04L 67/125 | |
| 2019/0339351 A1 * | 11/2019 | Sundia | G06K 7/10425 | |
| 2019/0340560 A1 * | 11/2019 | Sundia | G06K 7/10415 | |
| 2019/0385450 A1 * | 12/2019 | Kim | H04W 4/12 | |
| 2020/0202472 A1 * | 6/2020 | Barak | H04W 4/021 | |
| 2020/0234385 A1 * | 7/2020 | Vanslette | G06Q 50/163 | |
| 2021/0152976 A1 * | 5/2021 | Daoura | H04W 52/0229 | |

FOREIGN PATENT DOCUMENTS

| | | |
|---|---|---|
| EP | 2515625 B1 | 8/2013 |
| EP | 2515625 B1 | 8/2013 |
| JP | 2002131065 A | 5/2002 |
| JP | 2002334395 A | 11/2002 |
| JP | 3100052 U | 4/2004 |
| JP | 2005249606 A | 9/2005 |
| JP | 2007064756 A | 3/2007 |
| JP | 2008536206 A | 9/2008 |
| JP | 2014020936 A | 2/2014 |
| WO | 2009021068 A1 | 2/2009 |
| WO | 2015036575 A1 | 3/2015 |
| WO | WO-2015/036575 A1 | 3/2015 |

OTHER PUBLICATIONS

Supplementary European Search Report dated Mar. 22, 2021 for corresponding European Application No. 19796123.
Supplementary European Search Report dated Mar. 15, 2021 for corresponding co-pending European Application No. 19796225.
Office Action dated Jan. 15, 2021, in the co-pending U.S. Appl. No. 16/914,849.
Notice of Allowance dated Jul. 15, 2021 in the co-pending U.S. Appl. No. 16/914,849.
Office Action issued for corresponding JP Application No. 2020-561681 dated Feb. 17, 2023.

(56) References Cited

OTHER PUBLICATIONS

U.S. Appl. No. 16/139,546, filed Sep. 24, 2018.
U.S. Appl. No. 16/704,439, filed Dec. 5, 2019.
U.S. Appl. No. 16/914,849, filed Jun. 29, 2020.

* cited by examiner

SMART LOCATION DETERMINATION FOR ARRIVAL ESTIMATION AND GENERATION OF ARRIVAL ALERTS

CROSS REFERENCE TO RELATED APPLICATIONS

This Application claims priority to U.S. Provisional Application 62/666,416 filed on May 3, 2018 and U.S. Provisional Application 62/666,451 filed on May 3, 2018, the entire content of both of which are incorporated herein by reference.

TECHNICAL FIELD

The present technology pertains to systems and methods for arrival alerts, and more specifically pertains to adjustment in the amount of calculations performed at a server for determining a location of a device depending on the device's distance from a destination.

BACKGROUND

Current services that provide arrival alerts often rely on receiving continuous location updates from a moving target (e.g., a vehicle) in order determine, as accurately as possible, the timing for alerting the destination (e.g., a store) about the arrival of the moving target at the destination. For example, when a user is driving to a location of a store to pick up an ordered item, the system's objective is to provide an accurate advance alert (arrival alert) to the operator of the store so that the operator can ensure the user's order is ready for pick when the user arrives.

The determination of this timing alert, and improved accuracy thereof, further depends on taking into consideration additional information such as traffic conditions, weather conditions, etc. These services often obtain such additional information from external resources and databases. Retrieving all these information and running algorithms to accurately determine a tracking device's location and ultimately the timing of the alert, consume significant computational power and resources at servers operated by these services.

Criticality of extensive calculations and communications with external sources to obtain additional information depends on the tracking device's proximity and closeness to the timing at which the arrival alert is to be provided to an operator at the destination. For example, it may not be necessary to determine a user's exact location by performing all such calls to external resources as well as the internal calculations when a user is 20 miles and/or an hour away from the destination. A blind configuration of servers to perform detailed calculations of locations of tracking devices regardless of time and distance left to reach the destination, results in unnecessary and wasteful use of computation power and resources of such servers.

SUMMARY

Example embodiments are provided for a dynamic adjustment in the amount of calculations performed at a server for determining a location of a device depending on the device's distance from a destination for purposes of providing an arrival alert to the destination informing the destination of arrival of the tracking device and the associated user.

In one aspect, a method includes determining a zone around a destination; receiving location information from a tracking device that is traveling to the destination; based on the location information and the zone, determining whether the tracking device is within the zone to yield a determination; determining a remaining time for a user associated with the tracking device to reach the destination based on the determination; and providing an arrival alert to the destination regarding an arrival time of the user at the destination based on the remaining time and an arrival threshold.

In one aspect, a server includes memory having computer-readable instructions stored therein; and one or more processors. The one or more processors are configured to execute the computer-readable instructions to determine a zone around a destination based on an arrival threshold, the arrival threshold being indicative of a remaining time to arrival of a user associated with the tracking device at a destination; receive location updates from the tracking device; based on the location updates and the zone, determine whether the tracking device is within the zone to yield a determination; perform one of a first process or a second process for determining a current remaining time for arrival of the user at the destination based on the determination; and determine whether to provide an arrival alert to the destination based on the zone, the arrival threshold and the current remaining time.

In one aspect, one or more non-transitory computer-readable medium have computer-readable instructions stored thereon, which when executed by one or more processors, cause the one or more processors to determine a zone around a destination based on an arrival threshold, the arrival threshold being indicative of a remaining time to arrival of a user associated with the tracking device at a destination; receive location updates from the tracking device; based on the location updates and the zone, determine whether the tracking device is within the zone to yield a determination; perform one of a first process or a second process for determining a current remaining time for arrival of the user at the destination based on the determination; and determine whether to provide an arrival alert to the destination based on the zone, the arrival threshold and the current remaining time.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to reduce the amount of computations performed at a server site of a service provider for providing arrival alerts to destinations. As briefly described above, in addition to location updates received from a tracking device of a user who is traveling to a destination to pick an order for example, the server retrieves and takes into consideration many other factors in order to improve the accuracy of the determined location of the tracking device as well as the estimated time of arrival of the tracking device at the destination. These factors are pulled/retrieved from external resources and databases and various computationally intensive algorithms (machine learning algorithms) are implemented on them to provide better prediction of arrival times. However, such retrieval of these additional factors and running algorithms thereon may not be advantageous or critical when the tracking device is relatively far from the destination but they gradually become more critical and important as the tracking device reaches a threshold at which the server should alert the destination of user's arrival.

In other words, this disclosure addresses the need in the art for implementing a smart location determination scheme based on the relative distance of a tracking device (and associated user/moving object) from a destination.

The disclosure begins with a description of several example systems in which the concepts described herein can be implemented.

Figure 1:
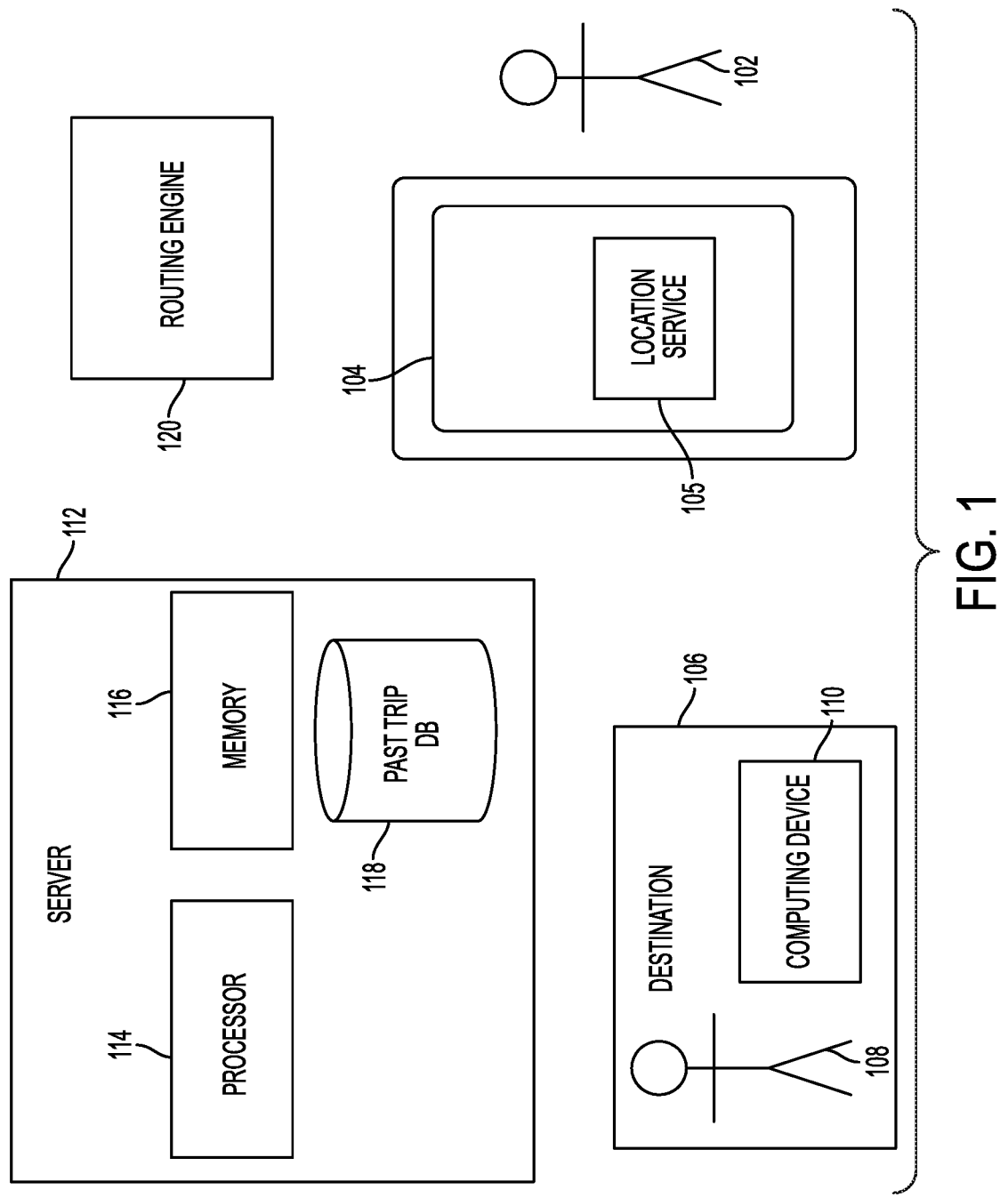
FIG. 1 shows an example system in accordance with an aspect of the present disclosure.

FIG. 1 illustrates an example system in accordance with one aspect of the present disclosure. As illustrated in FIG. 1, system 100 includes a user 102 associated with a tracking device 104 (user device 104 or customer device 104). While not shown in FIG. 1, user 102 and tracking device 104 can be associated with a moving object including, but not limited to, a car, a bus, a bike, a public transportation vehicle, etc. The tracking device 104 can be any known or to be developed electronic device capable of tracking a movement of the user 102 (and the associated moving object) and communicating the same to a server 112 over a wired and/or wireless communication platform such as over a cellular network or a WiFi connection. Examples of tracking device 104 include, but are not limited to, a cellular phone, a personal digital assistant (PDA), a laptop, a tablet, a wristband tracking object, etc. In one example, tracking device 104 has location service 105. Location service 105 can be any known or to be developed built-in sensor, device and/or location determining component such as a global positioning system (GPS) device capable of recording geographical coordinates (e.g., latitude and longitude) of tracking device 104 at any given point in time.

While not shown in FIG. 1, tracking device 104, server 112 and any other component of system 100 have other components for enabling communication with other components such as transceivers.

The system 100 further includes a destination 106. Destination 106 can be a target location that is to receive arrival alerts from server 112 informing an operator thereof of the timing of user 102's arrival at destination 106. For example, destination 106 can be a brick-and-mortar store, from which user 102 has ordered item(s) for purchase and is en route to pick up the order. Other examples of destination 106 include, but are not limited to, a restaurant, a department store, other types of service providers such as dry cleaning services, a library, etc. Therefore, it is important for server 112 to provide an arrival alert to destination 106 at a threshold time ahead of the arrival of user 102 (e.g., 8 minutes prior to user's arrival at destination 106) to ensure that the ordered item(s) are ready when user 102 arrives at destination 106. Therefore, the arrival alert needs to be as accurate as possible to avoid or reduce inconveniences (e.g., waiting for the ordered item(s) to be prepared for a period of time after arrival) experienced by user 102 and/or an operator at destination 106.

Destination 106 can have an operator 108 associated therewith such as an employee. Furthermore, destination 106 can have a computing device 110 with which operator 108 interacts to receive arrival alerts, send and receive identifying information to server 112 and/or track device 104, confirm/cancel/adjust orders, etc. Computing device 110 can be any known or to be developed device that is used by destination 106 and is capable of communicating with server 112 over a wired and/or wireless connection such as a WiFi connection. Examples of computing device 110 include, but are not limited to, a tablet, a stationary computer device, a mobile device, any other known or to be developed Point of Sale (POS) devices, etc.

System 100 also includes server 112. Server 112 can have one or more processors such as processor 114 capable of implementing one or more sets of computer-readable instructions stored in one or more memories such as memory 116. Execution of any one or more of these sets of instructions enable server 112 to implement functionalities of methods described below with reference to FIGS. 3-5. These functionalities include, but are not limited to, building destination specific models using machine learning, which can then be used to provide arrival prediction services, determining smart signaling for location receiving location updates, etc.

As shown in FIG. 1, server 112 can also have database 118 (can also be referred to as past trips database 118). Data stored in database 118, as will be described below, will be used by machine learning algorithms implemented by server 112 to build destination specific models and perform arrival prediction services.

System 100 can also include routing engine 120. Routing engine 120 can be any conventional routing engine such as those commonly associated with mapping applications. Such routing engines may take into account a distance to a destination and speed limits and in some cases current traffic, weather and time of day conditions in providing preliminary arrival times to server 112, which will be used by server 112 and logics implemented thereon to refine, revise and provide arrival alerts to destination 106. Furthermore, routing engine 120 may or may not account for other location specific factors such as most likely routes to the destination, likely stops along the way and any other learned factors for generating destination specific models for destinations at server 112.

Server 112 and routine engine 120 can be co-located physically or be configured to communicate over wired and/or wireless networks. Furthermore, each identified component of system 100 can communicate with other components of system 100 and/or any other external component using currently known or to be developed cellular and/or wireless communication technologies and platforms.

Figure 2:
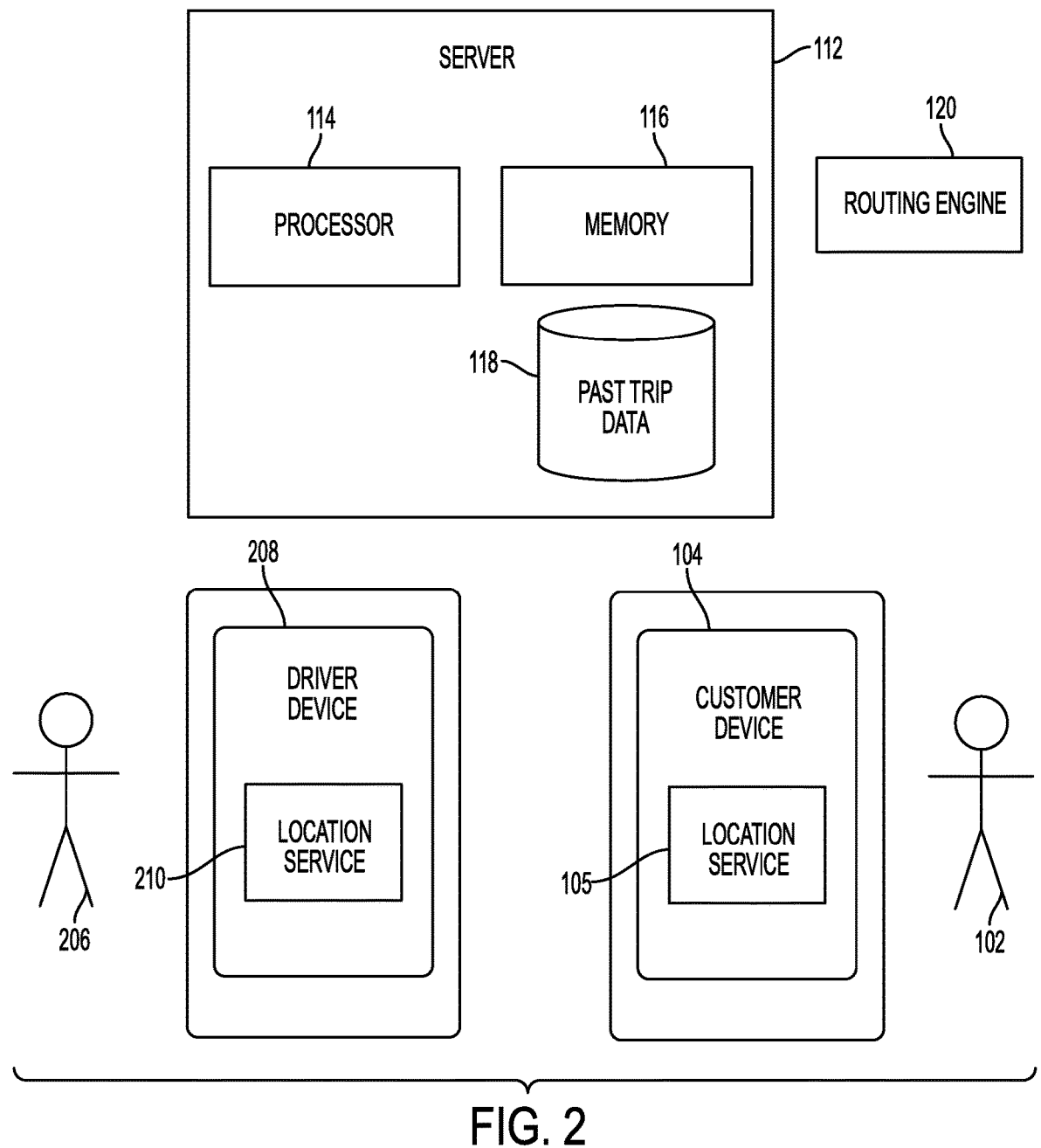
FIG. 2 shows an example system in accordance with an aspect of the present disclosure.

FIG. 2 illustrates an example system in accordance with one aspect of the present disclosure. System 200 of FIG. 2 is the same as system 100 of FIG. 1 except that instead of having user 102 travel to destination 106 to pick up item(s)/service(s) ordered as shown in FIG. 1, a destination such as destination 106 utilizes a delivery service (e.g. that of a driver) to deliver user 102's order(s) to user 102. Therefore, components of system 200 that have the same numerical reference as those in FIG. 1 will not be further described for sake of brevity.

In system 200 shown in FIG. 2, instead of destination 106 and its corresponding components, a driver 206 having an associated tracking device 208 is illustrated. In the context of FIG. 2, driver 206 and associated tracking device 208 is moving toward user 102 (similar to user 102 and tracking device 104 in FIG. 1) while user 102 is stationary (similar to destination 106 in FIG. 1). Accordingly, in the context of FIG. 2, an arrival alert is provided to user 102 informing user 102 of arrival of driver 206. Therefore, various types of calculations for location determination as described in this application, are performed for determining location of tracking device 208 and estimating its arrival at user 102.

Driver 206 and tracking device 208 can be associated with a moving object such as a vehicle operated by driver 206. Tracking device 208 can be any known or to be developed electronic device capable of tracking a movement of the driver 206 (and the associated moving object) and communicate the same with server 112 over a wired and/or wireless communication platform such as over a cellular network or a WiFi connection. Examples of tracking device 208 include, but are not limited to, a cellular phone, a personal digital assistant (PDA), a laptop, a tablet, a wristband tracking object, etc. Location service 210 of tracking device 208 can be the same as location service 105 of tracking device 104 (identified as customer device 104 in FIG. 2) described above with reference to FIG. 1.

While in FIGS. 1 and 2 various components are illustrated and described, inventive concepts are not limited thereto. For example, the number of users, devices, destinations, servers, etc., are not limited to those described and can be more or less. Furthermore, both systems 100 and 200 can have additional components, architecture and/or functionalities associated therewith that are ordinary and/or necessary for proper operations thereof and thus are within the scope of the present disclosure.

As briefly mentioned above, server 112 is tasked with tracking a moving object associated with user 102 in order to provide an alert to destination 106 at a threshold time ahead of user 102's arrival at destination 106, so that operator 108 at destination 106 can prepare and ready order(s) for user 102 to pick up when he or she arrives at destination 106. Such threshold time can be a configurable parameter determined based on various factors such as operator 108 feedback, user 102 feedback, automatic system determination based on prior trips to destination 106, etc. For example, operator 108 can request that server 112 provide operator 108 with an alert when user 102 is 8 minutes away from arriving at destination 106 for picking up his or her order(s). Therefore, server 112 needs to have precise information on user's location in order to provide, as accurately as possible, an arrival alert to operator 108 at destination 106 when user 102 is 8 minutes away from reaching destination 106.

Server 112 implements various techniques to improve the accuracy of the arrival alert provided to destination 106. For example, server 112 applies machine learning to various statistical data to create destination specific model(s) for destination 106. Various statistic data can include, but is not limited to, past completed trips of users to destination 106, past completed trips of user 102, traffic conditions, modes of transportation, types of moving objects associated with user 102 (and/or driver 206 in FIG. 2), weather conditions, times of days, events taking place en route to destination 106 or at destination 106, speed of the moving object, any construction, road closures and improvement, etc. The statistical data can be stored in database 118.

For example, a particular brick-and-mortar store may be located in a downtown area where traffic conditions vary greatly depending on time of day. Server 112 takes this information into consideration to build a destination specific model for the brick-and-mortar store located in the downtown area. During prediction of arrival of user 102 at the downtown location of the brick-and-mortar store and depending on the time of day, server 112 can augment its prediction and improve its arrival prediction using the corresponding destination specific model.

Figure 3:
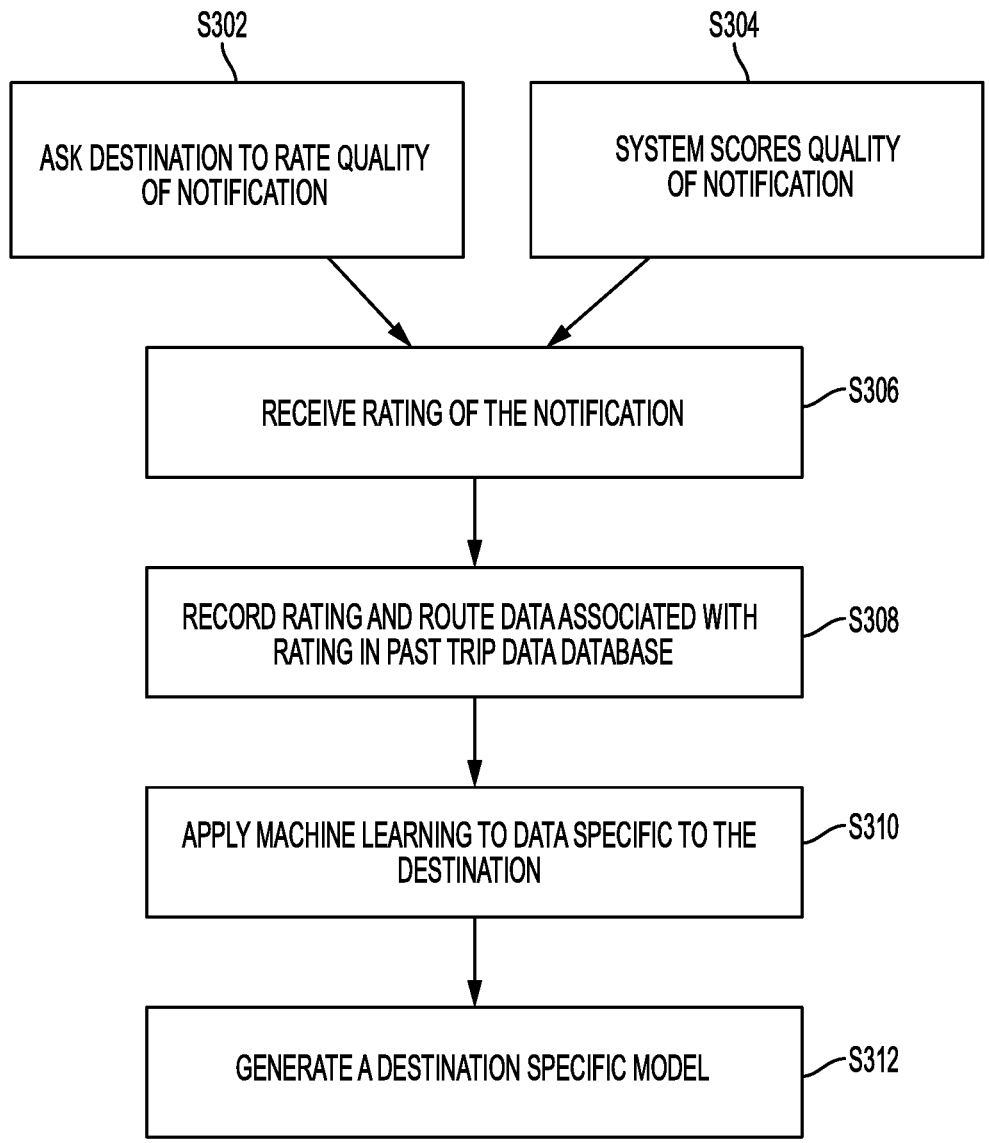
FIG. 3 shows an example method for creating a destination specific model in accordance with an aspect of the present disclosure.

FIG. 3 illustrates an example method for creating destination specific models in accordance with one aspect of the present disclosure. FIG. 3 will be described with reference to FIG. 1. However, the concepts described are equally applicable to the system of FIG. 2 as well. The method illustrated in FIG. 3 begins after one or more notifications have been provided to destination computing device 110 regarding an arrival prediction of user 102 at destination 106 to pick up order(s) (or one or more trips to destination 106 have been completed). Server 112 can store a collection of data in database 118. The data can be any one or more of statistical data examples provided above. In addition, server 112 can store information regarding the quality of past notifications and an identifier of the past notifications. For example, every time server 112 has provided an arrival alert to destination 106 indicating that user 102 will arrive in 8 minutes, server 112 compares this estimated arrival time to an actual time it took user 102 to arrive at destination 106. For example, while server 112 predicted, at time T0, that user 102 will arrive at destination 106 in 8 minutes, in reality, it may take user 102 6 minutes from T0 to arrive at destination 106. This indicates a prediction error of 25%. Server 112 stores this prediction error in database 118. During the next round of prediction and in providing the arrival alert, server 112 adjusts its prediction by 25% before providing the arrival alert (e.g., in the particular example described above, instead of providing the arrival alert at T0, server 112 now provides the arrival alert at T1 which is 2 minutes earlier than T0).

At S302, server 112 queries computing device 110 of destination 106 for rating a quality of a recently provided arrival alert. Operator 108 operating destination computing device 110 can respond to the query. Upon receiving the response, server 112 stores the rating at S306. In addition to, simultaneous with or instead of querying computing device 110 for rating, at S304, server 112 can calculate a rating or prediction error regarding the arrival alert, as described above. Similarly, the calculated rating is received at S306.

At S308, server 112 can record the received rating(s), per S302 and S304, in database 118 in association with an identification (ID) of the notification. The ID can be an identification of a particular transaction between user 102 and a merchant at destination 106, can be an identification associated with user 102, can be an identification associated with destination 106 or any combination thereof.

Server 112 can also store in database 118, information regarding a route taken by user 102 in connection with a recently completed trip to destination 106, and any other data pertinent to the trip that resulted in the notification. The route taken by user 102 can be learned from data reported by location service 105 to server 112 while user 102 and associated computing device 104 were traveling to destination 106. In some examples, from this route information, server 112 can determine if user 102 made any stops while in route to destination 106. Server 112 can also record a time of day, day of week, and date associated with the notification in database 118. Server 112 can aggregate the above data for trips by many users.

At S310, server 112 applies machine learning algorithm(s) to the historical data specific to destination 106 stored in database 118. At S312, server 112 generates destination specific model for destination 106 based on the machine learning algorithm(s) applied to stored data at S310. In one example, destination specific model may be created or trained by analyzing factors associated with notifications that were considered of good quality and factors associated with notifications that were considered of poor quality. Since the destination specific model is generated through machine learning, some dimensions of destination specific model may not have any semantic meaning while some dimensions may have a semantic significance. For example, those dimensions having a semantic meaning can include likelihood that a user will make other stops along the route, likelihood that a user will encounter traffic along the route, the most likely routes to the destination, etc.

In some examples, machine learning may initially be trained on all data in database 118 regardless of destination to result in a location non-specific model. In such examples, destination specific model may be the result of tuning the location non-specific model for factors relevant to the specific destination 106.

As can be seen from the above description, server 112 performs a series of detailed calculations to determine/estimate, as accurately as possible, a time of arrival of user 102 and associated tracking device 104 at destination 106. Every time a location update is received from tracking device 104, server 112 performs such process, which includes at least establishing of a communication session with an external database to retrieve factors influencing the time of arrival at destination 106 such as weather and traffic conditions as well as performing detailed operations and running algorithms to predict the arrival time.

As an example, assuming that tracking device 104 is an hour away from destination 106 and is currently configured to send location updates every minutes, this translates into server 112 having to carry out the above described computationally intensive process, roughly 60 times.

However, given that accuracy of determining location of tracking device 104 is important as the tracking device nears a time at which an arrival alert is to be sent to destination 106, such computationally extensive process need not be carried out one hour or 30 minutes away from destination 106. For example, if the arrival alert is to be transmitted to computing device 110 at destination 106 8 minutes from user 102's arrival, the determination of the exact location of tracking device 104 is critical after tracking device 104 passes the 11 minute mark (is 11 minutes away from destination 106) but is less critical when tracking device 104 is 20 minutes away or after the arrival alert is sent (e.g., 3 minutes away).

A concept used in tracking applications is called isochrones. Isochrones are typically contours created around a particular location (e.g., destination 106). Each isochrones has an approximate time associated therewith, which is indicative of the remaining time to destination 106. Naturally, as one approaches destination 106, isochrones become smaller is size and are indicative of less remaining times to destination 106 while isochrones become larger and are indicative of longer remaining times as one moves further away from the destination.

Figure 4:
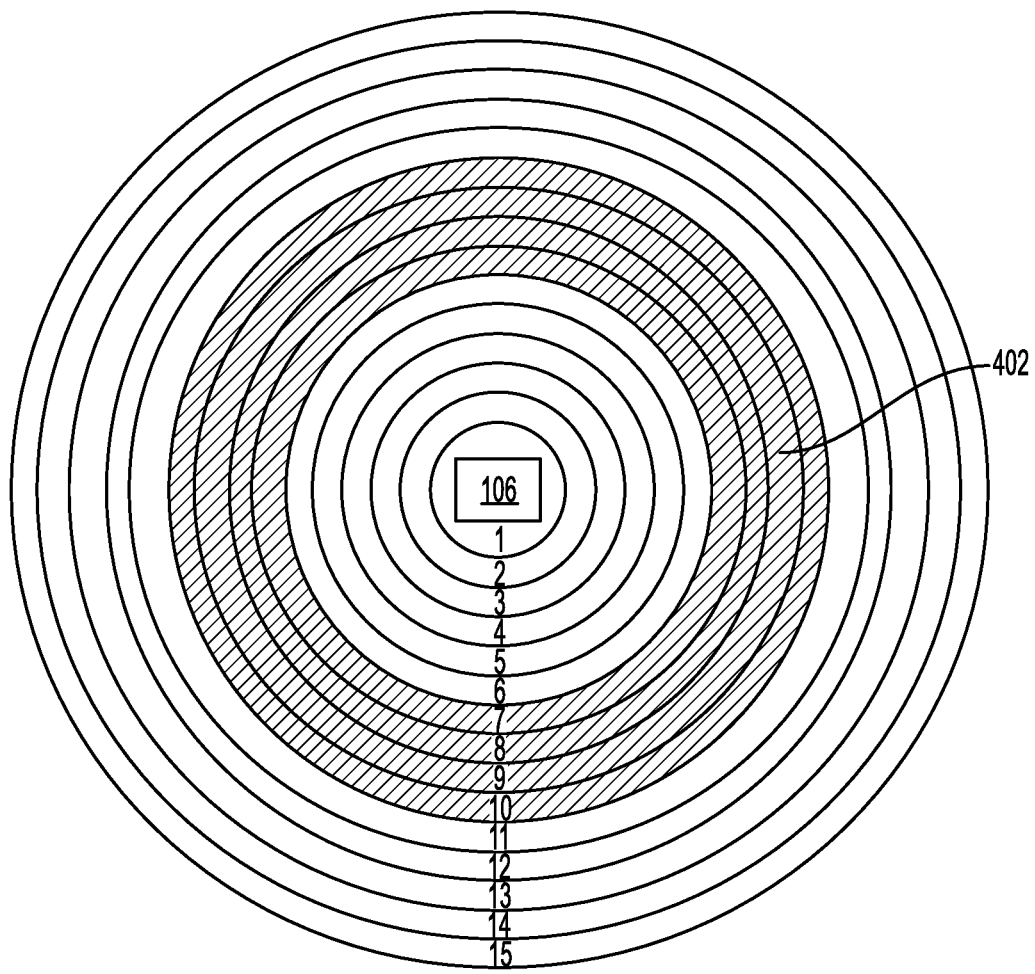
FIG. 4 shows an example of isochrones used in estimating the timing of the arrival of a tracking device at a destination in accordance with an aspect of the present disclosure.

FIG. 4 shows an example of isochrones used in estimating the timing of the arrival of a tracking device at a destination in accordance with an aspect of the present disclosure. Example of FIG. 4 illustrates 15 isochrones around destination 106. For ease of explanation and illustration, each isochrones is numbered such that it corresponds to the estimated remaining time to destination 106. For example, when tracking device is at or within isochrones 12, then approximately 12 minutes is left until user 102 arrives at destination 106.

The concept of isochrones is utilized in the present disclosure such that few isochrones that are closer to the time at which the arrival notification is to be provided to destination 106, are selected to form a "donut" or a "zone" around destination 106.

As an example, an assumption is made that operator 108 is to be notified of user 102's arrival at exactly 8 minutes (which is an example of an arrival threshold) therefrom. In this example, the donut can be defined from isochrone 6 to isochrone 10. This donut/zone is shown as shaded area 402 in FIG. 4. Accordingly, the sub-group of isochrones 6-10 form a time window (10 minutes to 6 minutes from destination 106) around the arrival threshold of 8 minutes mark, in this example.

Hereinafter, examples will be described according to which server 112 implements detailed and computationally intensive processes for determining an exact location of tracking device 104 from when tracking device 104 passes (enters) perimeters of isochrone 10 until it passes (exits) perimeters of isochrone 6 as it approaches destination 106. This computationally intensive process can be defined as one in which server 112 retrieves all relevant factors whether stored internally at database 118 (e.g., data corresponding to past trips) or retrieved from external sources such as public or private weather and traffic databases, etc.

However, outside the defined donut and upon receiving a location update from tracking device 104, server 112 performs minimal calculations to determine a rough estimate of the tracking device's location and remaining time to destination 106. Performing minimal calculations to obtain a rough estimate of location of tracking device 104 can be interpreted to be based on a current location of tracking device 104 and distance thereof to destination 106 without taking into consideration other factors that influence the remaining time to destination 106 including, but not limited to, historical data stored at server 112, traffic conditions, weather conditions, time of day, etc.

This process is hereinafter referred to as smart location determination where server 112 intelligently and selectively applies the computationally extensive process to determine the exact location of tracking device 104 and hence the remaining time to destination 106, depending on whether tracking device 104 is within a defined donut or not.

Figure 5:
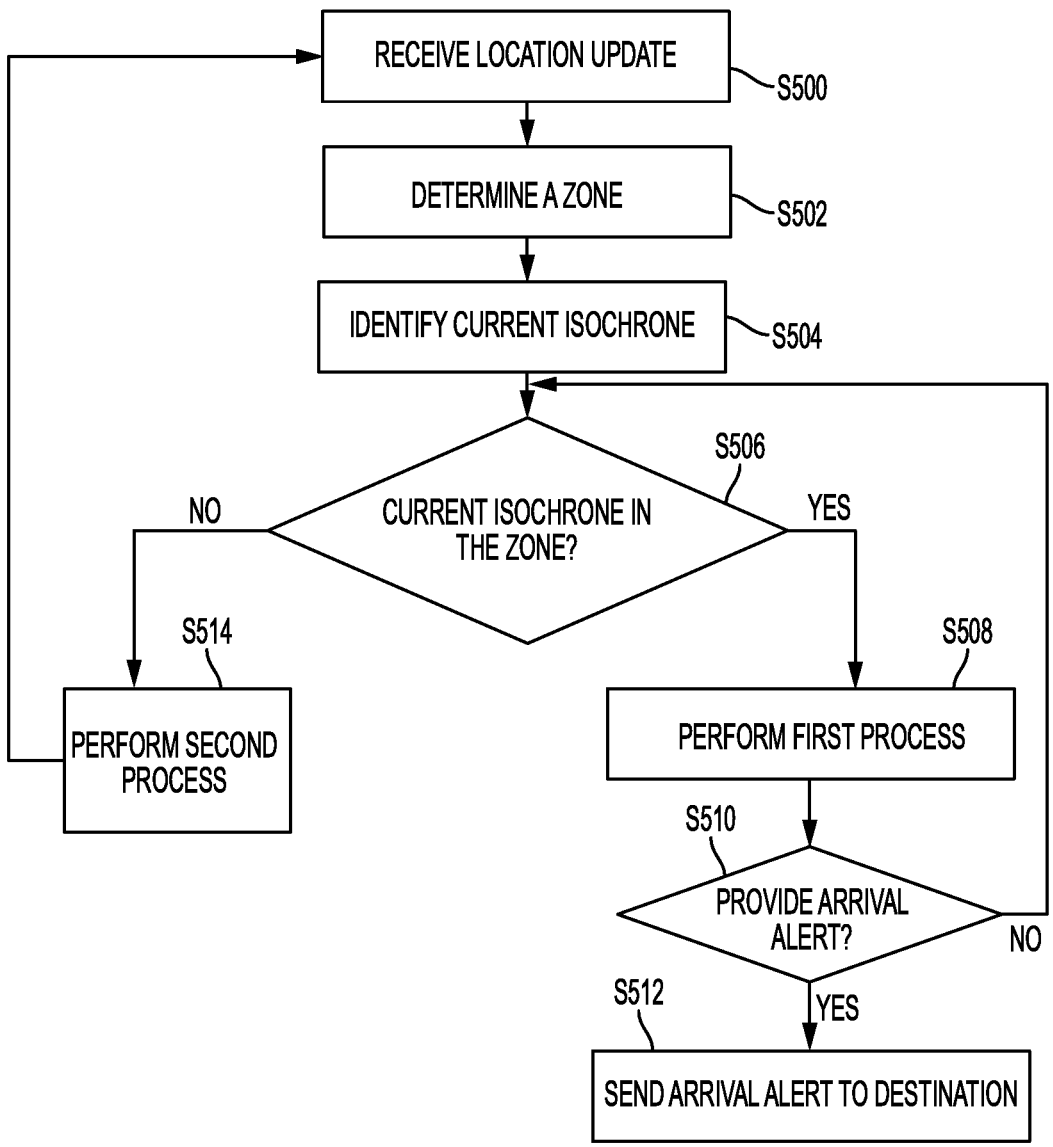
FIG. 5 shows an example method of implementing smart location determination in accordance with an aspect of the present disclosure.

FIG. 5 illustrates an example method of implementing smart location determination in accordance to an aspect of the present disclosure. Method of FIG. 5 is described from the perspective of server 112 and with reference to FIG. 1.

However, the method of FIG. 5 is equally applicable to the system of FIG. 2. Furthermore, it is clear to those having ordinary skill in the art that one or more processors such as processor 114 of server 112 executes computer readable instructions stored on or more memories such as memory 116 to implement the functions described below.

At S500, server 112 receives a location update from tracking device 104. The location update can be provided in the form of a global positioning system (GPS) signal transmitted by tracking device 104 to a nearby cell tower and thereafter to server 112 (e.g., through the cellular networks backend gateway to the network) or in the alternative to a nearby connected access point when tracking device 104 is communicating over a WiFi connection.

At S502, server 112 automatically determines or in the alternative receives specifications of a zone (donut) around destination 106. Server 112 can automatically determine/define the zone based on location specific model associated with destination 106, various historical and live data corresponding to geographical situation, traffic and weather conditions around destination 106, etc.

A zone such as zone 402, as described above, may be defined as a sub-group of isochrones around an isochrone corresponding to the arrival threshold at which an arrival alert is to be provided to destination 106 of upcoming arrival of user 102 associated with tracking device 014. This sub-group of isochrones may define a time window around the arrival threshold (e.g., +/−2 minutes from the example of 8 minute mark described above). A size of the time window may be a configurable parameter that may be defined based on experiments and/or empirical studies.

After receiving the location update at S500 and the specification of the zone, at S504, server 112 identifies a current isochrone in which tracking device 104 is located at the time of receiving the location update. The isochrone is identified based on a comparison of the location updates of tracking device 104 received at S500 to a map/database of determined isochrones around destination 106 (it is assumed that sever 112 has the isochrones map of destination 106 available).

Thereafter, at S506, server 112 determines if the identified current isochrone at S502 falls within the zone defined at S502.

If the identified isochrone falls within the zone, then at S508, server 112 performs a detailed (and computationally extensive) process (first process) for determining the location of tracking device 104 and remaining time to destination 106, as accurately as possible, where such process takes into consideration not only the updated location of tracking device 104 received at S500 but also various other factors retrieved form one or more external sources such as current traffic conditions on a route/path on which the user (and corresponding tracking device 104) is traveling to the destination, current weather conditions (on or within a geographical proximity of the route), specific conditions associated with the current route path taken by tracking device 104 to reach destination 106, as well as destination specific model developed by server 112 and stored thereon based on past trip data stored in database 118, etc.

In one example such exact and detailed calculation of location of tracking device 104 allows server 112 to provide a more accurate arrival alert to destination 106.

Thereafter, at S510, server 112 determines whether to provide an arrival alert to destination 106 or not. This determination is based on whether the determined location of tracking device and the associated remaining time coincides with the arrival threshold at which an arrival alert is to be provided to destination 106. In the example above, this determination translates into determining if the current location of tracking device 104 indicates that tracking device 104 and user 102 are at the 8 minute mark (example arrival threshold) from destination 106 such that server 112 should inform destination 106 by providing the arrival alert.

If at S510, server 112 determines that the arrival alert is to be provided, then at S512, server 112 sends the arrival alert to destination 106 (e.g., to computing device 110 associated with destination 106) using any known or to be developed communication scheme.

However, if at S510, server 112 determines that the arrival alert is not to be provided, then the process reverts back to S506 and S506, S508, S510, S512 and S514 are repeated, as appropriate and applicable.

Referring back to S506, if the identified isochrone falls outside the zone defined at S502, at S514, server 112 only determines a rough estimate (second process) of tracking device's location using, for example, only the currently location of tracking device 104 and distance thereof to destination 106.

Therefore, while tracking device 104 is not within the zone, server 112 can reduce its data and power usage and save network resources but skipping a detailed and exact calculations that may not be as critical to the providing of accurate arrival alerts to destination 106 as compared to when tracking device 104 is at or near the timing (e.g., 8 minute mark/within donut 402) at which server 112 is to provide the arrival alert to destination 106.

Figure 6:
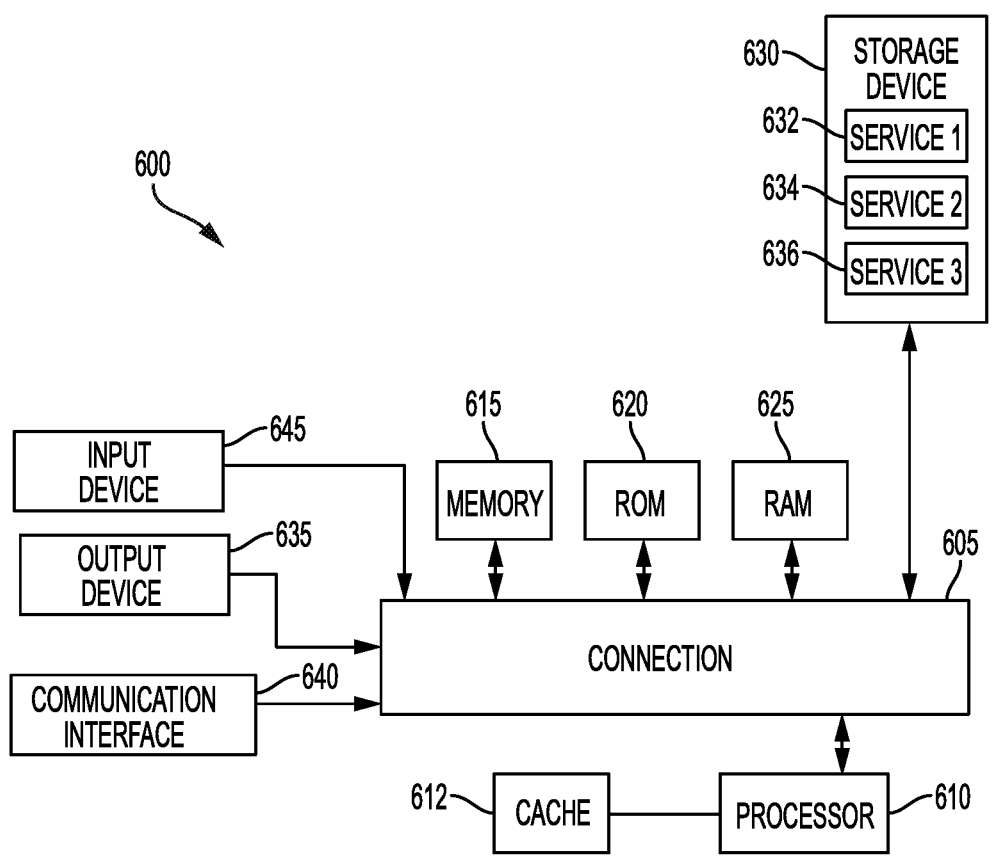
FIG. 6 shows an example of a system for implementing the present technology in accordance one aspect of the present disclosure.

FIG. 6 shows an example of a system for implementing the present technology in accordance one aspect of the present disclosure. FIG. 6 illustrates computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) and random access memory (RAM) to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing arrival alerts, the method comprising:
   determining a zone around a destination based on a plurality of isochrones around the destination, each isochrone being associated with a corresponding remaining time to the destination;
   receiving location information from a tracking device that is traveling to the destination, the location information corresponding to at least one of the plurality of isochrones;
   based on the location information and the zone, determining whether the tracking device is within the zone;
   determining a remaining time for a user associated with the tracking device to reach the destination depending on whether the tracking device is within the zone or not, wherein the remaining time is determined using a first process when the tracking device is within the zone and the remaining time is determined using a second process when the tracking device is not within the zone, the remaining time determined using the first process is based on at least the location information, a destination specific model, and at least one external condition and is more precise than the remaining time determined using the second process, the second process excluding the destination specific model and being based on the location information and a remaining distance of the tracking device to the destination; and
   providing an arrival alert to the destination regarding an arrival time of the user at the destination based on the remaining time and an arrival threshold.

2. The computer-implemented method of claim 1, wherein the at least one external condition is one of current traffic conditions on a route on which the tracking device is traveling to the destination and current weather conditions.

3. The computer-implemented method of claim 1, wherein determining the zone comprises:
defining the zone as a sub-group of the plurality of isochrones.

4. The computer-implemented method of claim 3, wherein corresponding remaining times of the sub-group of the plurality of isochrones form a time window around the arrival threshold.

5. The computer-implemented method of claim 1, further comprising: generating the destination-specific model for the destination.

6. The computer-implemented method of claim 5, wherein the destination-specific model is generated in part using a database of past completed trips to the destination.

7. The computer-implemented method of claim 5, wherein the destination-specific model is generated using a machine learning model applied to statistic data associated with historical trips to the destination.

8. A server comprising:
memory having computer-readable instructions stored therein; and
one or more processors configured to execute the computer-readable instructions to:
determine a zone around a destination based on an arrival threshold, the arrival threshold being indicative of a remaining time to arrival of a user associated with a tracking device at the destination, the zone being determined based on a plurality of isochrones around the destination, each isochrone being associated with a corresponding remaining time to the destination;
receive location updates from the tracking device, the location updates indicating a current location of the tracking device relative to at least one of the plurality of isochrones;
based on the location updates and the zone, determine whether the tracking device is within the zone;
determine a remaining time to arrival of the user at the destination using a first process when the tracking device is within the zone or using a second process when the tracking device is not within the zone, the remaining time determined using the first process is based on at least the location updates, a destination specific model and at least one external condition and is more precise relative to the remaining time determined using the second process, the second process excluding the destination specific model and being based on the location updates and a remaining distance of the tracking device to the destination; and
determine whether to provide an arrival alert to the destination based on the zone, the arrival threshold and the remaining time.

9. The server of claim 8, wherein the one or more processors are configured to execute the computer-readable instructions to: determine the zone as a sub-group of the plurality of isochrones.

10. The server of claim 9, wherein the one or more processors are configured to execute the computer-readable instructions to determine that the tracking device is within the zone if a current isochrone associated with a current location of the tracking device is one of the sub-group of the plurality of isochrones.

11. The server of claim 8, wherein
the destination specific model is developed by the server for the destination based on data of past trips of users to the destination; and
the at least one external condition includes current traffic conditions on a route on which the tracking device is traveling to the destination, current weather conditions and historical data indicative of one or more of estimation errors associated with previous arrival alerts provided by the server to a computing device at the destination.

12. The server of claim 8, wherein the one or more processors are configured to execute the computer-readable instructions to perform a computationally less intensive process for determining the remaining time using the second process compared to the first process.

13. The server of claim 12, wherein the computationally less intensive process includes determining the remaining time based on the location updates and a remaining distance of the tracking device to the destination.

14. The server of claim 8, wherein the one or more processors are configured to generate the destination-specific model using a machine learning model applied to statistic data associated with historical trips to the destination.

15. One or more non-transitory computer-readable medium having computer-readable instructions stored thereon, which when executed by one or more processors, cause the one or more processors to:
determine a zone around a destination based on an arrival threshold, the arrival threshold being indicative of a remaining time to arrival of a user associated with a tracking device at the destination, the zone being determined based on a plurality of isochrones around the destination, each isochrone being associated with a corresponding remaining time to the destination;
receive location updates from the tracking device, the location updates indicating a current location of the tracking device relative to at least one of the plurality of isochrones;
based on the location updates and the zone, determine whether the tracking device is within the zone;
determine a remaining time to arrival of the user at the destination using a first process when the tracking device is within the zone or using a second process when the tracking device is not within the zone, the remaining time determined using the first process is based on at least the location updates, a destination specific model and at least one external condition and is more precise relative to the remaining time determined using the second process, the second process excluding the destination specific model and being based on the location updates and a remaining distance of the tracking device to the destination; and
determine whether to provide an arrival alert to the destination based on the zone, the arrival threshold and the remaining time.

16. The one or more non-transitory computer-readable medium of claim 15, wherein the execution of the computer-readable instructions by the one or more processors, cause the one or more processors to provide the arrival alert to the destination when the tracking device is within the zone and the remaining time associated with a current location of the tracking device in the zone corresponds to the arrival threshold.

17. The one or more non-transitory computer-readable medium of claim 15, wherein the execution of the computer-readable instructions by the one or more processors, cause the one or more processors to generate the destination-specific model for the destination.

18. The one or more non-transitory computer-readable medium of claim 17, wherein the destination-specific model is generated in part using a database of past completed trips to the destination.

19. The one or more non-transitory computer-readable medium of claim 17, wherein the destination-specific model is generated using a machine learning model applied to statistic data associated with historical trips to the destination.

\* \* \* \* \*